United States Patent
Takahashi et al.

(10) Patent No.: US 10,315,305 B2
(45) Date of Patent: Jun. 11, 2019

(54) ROBOT CONTROL APPARATUS WHICH DISPLAYS OPERATION PROGRAM INCLUDING STATE OF ADDITIONAL AXIS

(71) Applicant: FANUC CORPORATION, Yamanashi (JP)

(72) Inventors: Hiromitsu Takahashi, Yamanashi (JP); Xianying Wu, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 73 days.

(21) Appl. No.: 15/497,205

(22) Filed: Apr. 26, 2017

(65) Prior Publication Data

US 2017/0312912 A1    Nov. 2, 2017

(30) Foreign Application Priority Data

Apr. 28, 2016  (JP) .................................. 2016-091960

(51) Int. Cl.
| | |
|---|---|
| *G05B 15/00* | (2006.01) |
| *G05B 19/00* | (2006.01) |
| *B25J 9/00* | (2006.01) |
| *B25J 18/00* | (2006.01) |
| *B25J 9/16* | (2006.01) |
| *G05B 19/4068* | (2006.01) |

(52) U.S. Cl.
CPC . *B25J 9/00* (2013.01); *B25J 9/16* (2013.01); *B25J 18/00* (2013.01); *G05B 19/4068* (2013.01); *G05B 2219/39* (2013.01); *G05B 2219/39414* (2013.01); *G05B 2219/39422* (2013.01)

(58) Field of Classification Search
None
See application file for complete search history.

(56) References Cited

U.S. PATENT DOCUMENTS

| | | | | |
|---|---|---|---|---|
| 4,891,763 | A * | 1/1990 | Kuriyama | G05B 19/40931 700/183 |
| 5,003,237 | A * | 3/1991 | Kimura | G05B 19/423 318/570 |
| 5,053,976 | A * | 10/1991 | Nose | B25J 9/1607 700/251 |
| 5,079,491 | A * | 1/1992 | Nose | G05B 19/4148 318/567 |

(Continued)

FOREIGN PATENT DOCUMENTS

| | | |
|---|---|---|
| CN | 101362333 A | 2/2009 |
| CN | 103252779 A | 8/2013 |

(Continued)

*Primary Examiner* — Bhavesh V Amin
(74) *Attorney, Agent, or Firm* — Hauptman Ham, LLP

(57) ABSTRACT

A robot control apparatus controls a robot having six drive axes and a drive axis as an additional axis. The control apparatus includes a display control part which controls a display of a display part. The display control part displays, on the display part, a first picture which displays an operation program including an operation statement and a second picture which displays a state of the drive axes included in the operation statement. The display control part displays the operation statement including a state of the additional axis without including a state of the six drive axes in the first picture.

4 Claims, 5 Drawing Sheets

(56) References Cited

U.S. PATENT DOCUMENTS

| | | | | |
|---|---|---|---|---|
| 5,113,338 A * | 5/1992 | Seki | ................ | G05B 19/40935 700/180 |
| 5,177,420 A * | 1/1993 | Wada | ................... | G05B 19/056 318/568.1 |
| 5,300,868 A * | 4/1994 | Watanabe | .............. | B25J 9/1607 318/568.13 |
| 5,315,222 A * | 5/1994 | Kasagami | .............. | B25J 9/1664 318/561 |
| 5,327,057 A * | 7/1994 | Kishi | ...................... | G05B 19/41 318/561 |
| 5,479,078 A * | 12/1995 | Karakama | ........... | G05B 19/425 318/568.13 |
| 5,485,552 A * | 1/1996 | Mizuno | .................. | B25J 9/1658 700/257 |
| 5,488,689 A * | 1/1996 | Yamato | .................. | B25J 9/1671 700/264 |
| 5,920,678 A * | 7/1999 | Watanabe | .............. | B25J 9/1664 700/255 |
| 5,937,143 A * | 8/1999 | Watanabe | .............. | B25J 9/1671 700/264 |
| 6,167,328 A * | 12/2000 | Takaoka | ................ | B25J 9/1671 318/568.1 |
| 6,654,666 B1 * | 11/2003 | Terada | ................ | G05B 19/425 700/250 |
| 7,430,456 B2 * | 9/2008 | Ruden | ................... | B25J 9/1692 318/568.13 |
| 8,731,886 B2 * | 5/2014 | Ryou | ..................... | G06F 17/10 703/7 |
| 8,831,777 B2 * | 9/2014 | Kimoto | .................. | B25J 9/1651 700/245 |
| 8,989,904 B2 * | 3/2015 | Dreslinski | ............. | B25J 9/1674 700/264 |
| 9,339,932 B2 * | 5/2016 | Kanehara | ............... | B25J 9/1671 |
| 9,352,467 B2 * | 5/2016 | Atohira | ................. | B25J 9/1692 |
| 9,415,509 B2 * | 8/2016 | Krause | .................. | B25J 9/1605 |
| 9,815,196 B2 * | 11/2017 | Zimmermann | ........ | B25J 9/1633 |
| 2009/0043425 A1 * | 2/2009 | Ito | .......................... | B25J 9/1671 700/256 |
| 2009/0299526 A1 * | 12/2009 | Ditscher | ................ | B25J 9/1671 700/264 |
| 2017/0312912 A1 * | 11/2017 | Takahashi | .................. | B25J 9/16 |

FOREIGN PATENT DOCUMENTS

| | | |
|---|---|---|
| CN | 104339360 A | 2/2015 |
| DE | 102011079117 A1 | 1/2013 |
| JP | H3-131484 A | 6/1991 |
| JP | H8-11073 A | 1/1996 |
| JP | H11-33957 A | 2/1999 |
| JP | 2004-151976 A | 5/2004 |
| JP | 2011-11263 A | 1/2011 |
| JP | 2014-161921 A | 9/2014 |
| WO | 2013/038544 A1 | 3/2013 |

* cited by examiner

```
CASE1                                          ∧ ⊡
    P[2]  UF:0  UT:1
    J1        0.000  deg   J4      0.000 deg
    J2      -15.000  deg   J5    -90.000 deg
    J3      -30.000  deg   J6      0.000 deg
    E1       75.000  deg

EDIT   DONE  [REPRE]  >
```

FIG. 8

```
CASE1                                          ∧ ⊡
     1:J   P[1]  100% FINE
     2:   WAIT    .10(sec)
     3:   CALL  DIAG1
     4:L   P[2]  1000mm/sec FINE
     5:J   P[3]  100% CNT90
    [End]

[CHOICE] POSITION  >
```

ROBOT CONTROL APPARATUS WHICH DISPLAYS OPERATION PROGRAM INCLUDING STATE OF ADDITIONAL AXIS

RELATED APPLICATIONS

The present application claims priority to Japanese Patent Application Number 2016-091960 filed Apr. 28, 2016, the disclosure of which is hereby incorporated by reference herein in its entirety.

BACKGROUND OF THE INVENTION

1. Field of the Invention

The present invention relates to a control apparatus which controls a robot.

2. Description of the Related Art

In a manufacturing factory which manufactures products, a robot is provided in order to perform a predetermined operation. The robot is configured in such a manner that a position and a posture can be changed according to the operation. The robot has a plurality of drive axes, and directions of arms are changed at the drive axes, whereby the position and the posture are changed. In a common robot, six or less drive axis is provided. For example, six drive axes are provided, whereby the position and the posture of the robot can be variously changed. In recent years, a seven-axis robot to which further one drive axis is added has been known. Such a drive axis as further added is referred to as a redundant axis.

Japanese Unexamined Patent Publication No. 2011-11263A discloses a program creation device which generates an operation program of a robot having seven drive axes. The publication discloses a control for generating in an offline manner an operation program in which the avoidance of interference with a peripheral device is taken into consideration.

Japanese Unexamined Patent Publication No. 2014-161921A discloses a simulator for a robot having a redundant axis. The publication discloses that when an operation handle is operated by the operator, a displacement amount or a rotation amount of a control point based on the operation is calculated, and a virtual image in which a posture of the robot is changed is displayed by a display part.

SUMMARY OF THE INVENTION

A robot control apparatus controls a robot based on an operation program. The operator creates the operation program in accordance with a predetermined rule. In the operation program, an operation statement relating to an operation of the robot is recorded. The operator can predict the operation of the robot by referring to the operation program as created. The operator can determine whether or not the operation program as created is correct.

With respect to the robot having a six or less drive axis, the operator can easily estimate a state and the operation of the robot by referring to the operation program. However, there are a large number of operators who are not accustomed to a robot having an additional axis as a redundant axis. Thus, there has been a problem that it is difficult for the operator to estimate a state of the additional axis and the operation of the robot.

In particular, in the control apparatus, there are cases in which when the operation program is displayed, a picture which displays a main operation statement of the operation program and a picture which displays a detailed content of each operation statement are switched to be displayed. In such a case, there has been a problem that the operator is needed to switch the pictures in order to obtain information on the additional axis, and thus estimating the state of the additional axis and the operation of the robot is difficult.

A robot control apparatus of the present invention controls a robot having six drive axes and an additional axis. The control apparatus includes a display part which provides a display of an operation program in which an operation statement relating to an operation of the robot is recorded and a display control part which controls the display of the display part. The display control part displays, on the display part, a first picture which displays the operation program including the operation statement and a second picture which displays a state of the drive axes included in the operation statement. The display control part further displays, in the first picture, the operation statement including a state of the additional axis without including a state of the six drive axes.

In the present invention as described above, the display control part can be configured in such a manner as to be capable of editing the state of the additional axis in the operation statement in the first picture.

BRIEF DESCRIPTION OF THE DRAWINGS

FIG. 7 is a second picture displayed by the display part according to the embodiment.

FIG. 8 is a first picture displayed by the display part according to a comparative embodiment.

DETAILED DESCRIPTION

Referring to FIG. 1 to FIG. 8, a robot control apparatus according to an embodiment will be described. A robot according to the present embodiment is an articulated robot including a plurality of joint parts.

Figure 1:
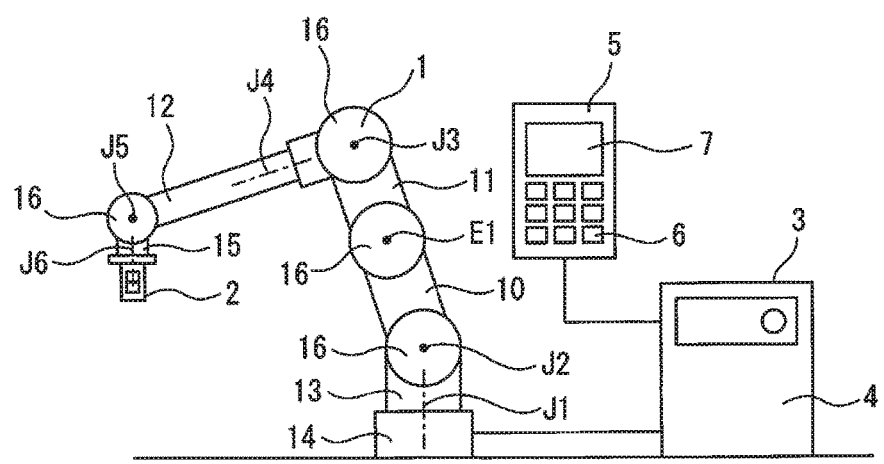
FIG. 1 is a schematic diagram of a robot device according to an embodiment.

FIG. 1 is a schematic diagram of a robot device according to the present embodiment. The robot device includes an end effector 2 which performs a predetermined operation on a workpiece and a robot 1 which moves the end effector 2. As the end effector 2, an operation tool which performs an optional operation can be employed. For example, an optional operation tool such as a hand which holds and releases a workpiece, a welding gun which performs welding, or an operation tool for painting can be employed as the end effector 2.

The robot 1 according to the present embodiment includes a base 14 which is fixed to an installation surface and a rotation part 13 which is supported by the base 14. The robot 1 includes arms 10 to 12. Among respective arms 10 to 12, the joint parts 16 are disposed. The directions of arms 10 to 12 change at the joint part 16. The robot 1 includes a wrist 15 which is connected to the arm 12 through the joint part 16. The end effector 2 is fixed to the wrist 15.

The robot device includes a control apparatus 3 which controls the robot 1 and the end effector 2. The control apparatus 3 includes a control apparatus main body 4 and an operation panel 5 which is connected to the control apparatus main body 4. The operation panel 5 includes an input part 6 through which the operator inputs information relating to a control to the control apparatus 3. The input part 6 is configured by a communication device which acquires information from a keyboard or other devices, and the like.

The operation panel 5 includes a display part 7 which displays the information relating to a control. The display part 7 is configured by, for example, a liquid crystal display panel or the like. Note that as the display part 7 according to the present embodiment, a touch panel type display panel is employed. Accordingly, the display part 7 also functions as the input part through which information on a control is inputted. Thus, the display part may have a function of the input part.

Figure 2:
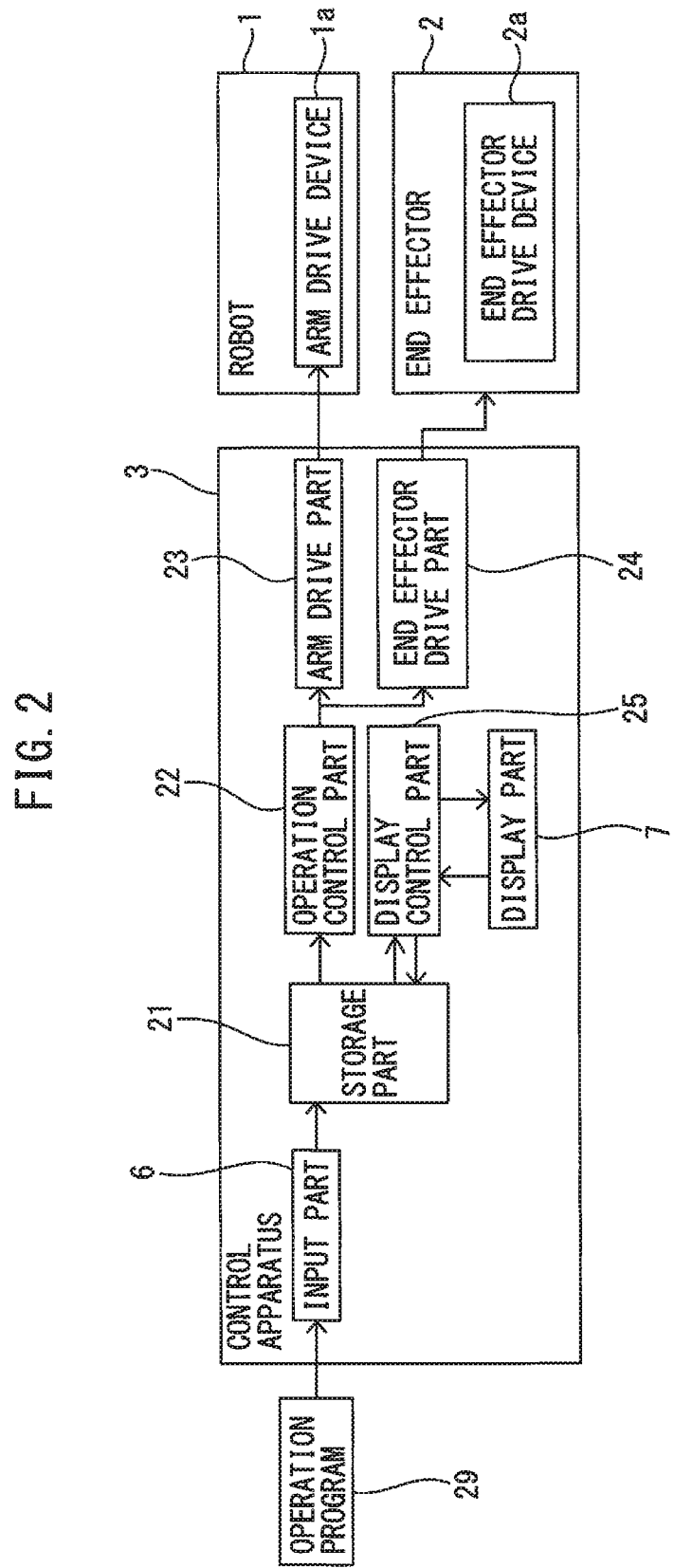
FIG. 2 is a block diagram of the robot device according to the embodiment.

In FIG. 2, a block diagram of the robot device according to the present embodiment is illustrated. Referring to FIG. 1 and FIG. 2, the control apparatus 3 includes a arithmetic processing device including a CPU (central processing unit), a RAM (random access memory), a ROM (read only memory), and the like which are connected to one another via a bus. The arithmetic processing device is provided in the interior of the control apparatus main body 4.

An operation program 29 which is predetermined to perform an operation of the robot 1 is inputted to the control apparatus 3. The operation program 29 is inputted through the input part 6 and stored in a storage part 21. An operation control part 22 transmits an operation command for driving the robot 1 and the end effector 2 based on the operation program 29.

The operation control part 22 transmits an operation command for driving an arm drive device 1a to an arm drive part 23. The arm drive part 23 includes an electric circuit which drives the arm drive device 1a including a motor of the robot 1 and the like. The arm drive part 23 supplies electricity to the arm drive device 1a based on the operation command from the operation control part 22. The arm drive device 1a drives, whereby directions of the arms 10 to 12 and the wrist 15 are adjusted.

The operation control part 22 transmits an operation command for driving the end effector 2 to an end effector drive part 24. The end effector drive part 24 includes an electric circuit which drives an end effector drive device 2a including a motor and the like. The end effector drive part 24 supplies electricity to the end effector drive device 2a based on the operation command.

Referring to FIG. 1, the robot 1 according to the present embodiment has six drive axes J1 to J6. The drive axis J1 is a drive axis which rotates the rotation part 13. The drive axes J2 and J3 are drive axes which change directions of the arms 10 and 12, respectively. The drive axis J4 is a drive axis which changes a direction of the wrist 15 by rotating the arm 12 along a circumferential direction of the arm 12. The drive axis J5 is a drive axis which changes a direction of the wrist 15. The drive axis J6 is a drive axis which rotates the wrist 15 around a rotation axis which extends in a direction in which the wrist 15 extends.

The robot 1 according to the present embodiment has a drive axis E1 serving as an additional axis in addition to the six drive axes J1 to J6. In other words, the robot 1 according to the present embodiment has seven drive axes. The drive axis E1 according to the present embodiment is a drive axis which changes a direction of the arm 11. There are many cases in which a common robot has six or less drive axis. The drive axis E1 which is an additional axis is referred to as a redundant axis. The additional axis indicates a seventh or greater drive axis. For example, when eight drive axes are included, a seventh drive axis and an eighth drive axis correspond to the additional axes.

Figure 3:
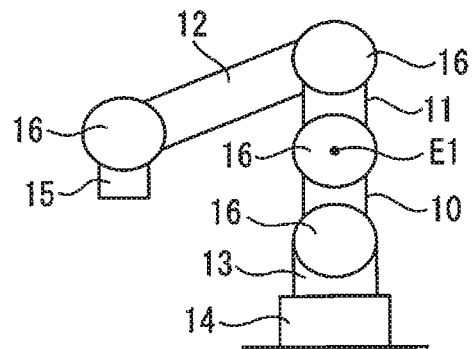
FIG. 3 is first schematic diagram of a robot which illustrates an operation of an additional axis according to the embodiment.
Figure 4:
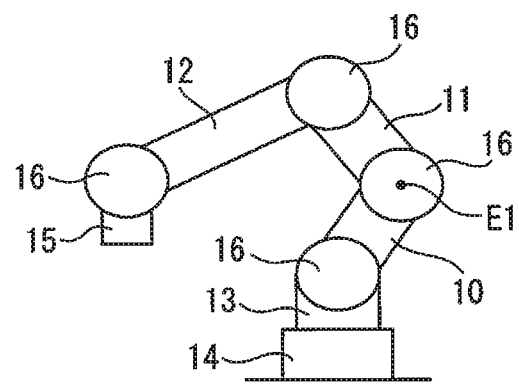
FIG. 4 is second schematic diagram of the robot which illustrates the operation of the additional axis according to the embodiment.

In FIG. 3, first schematic diagram of the robot which illustrates a state of drive of the additional axis is illustrated. In FIG. 4, second schematic diagram of the robot which illustrates a state of drive of the additional axis is illustrated. In FIG. 3, a state in which an angle of drive at the drive axis E1 is 0° is illustrated. In FIG. 4, a state in which an angle of drive at the drive axis E1 is 75° is illustrated. A state of the drive axis can be represented by an angle based on a predetermined direction. An angle for driving is designated at each drive axis, whereby the state of the drive axis is set. The position and the posture of the robot 1 are set. The operator can create the operation program while estimating such state of the drive axes of the robot. Alternatively, the operator can confirm and modify the operation program.

Figure 5:
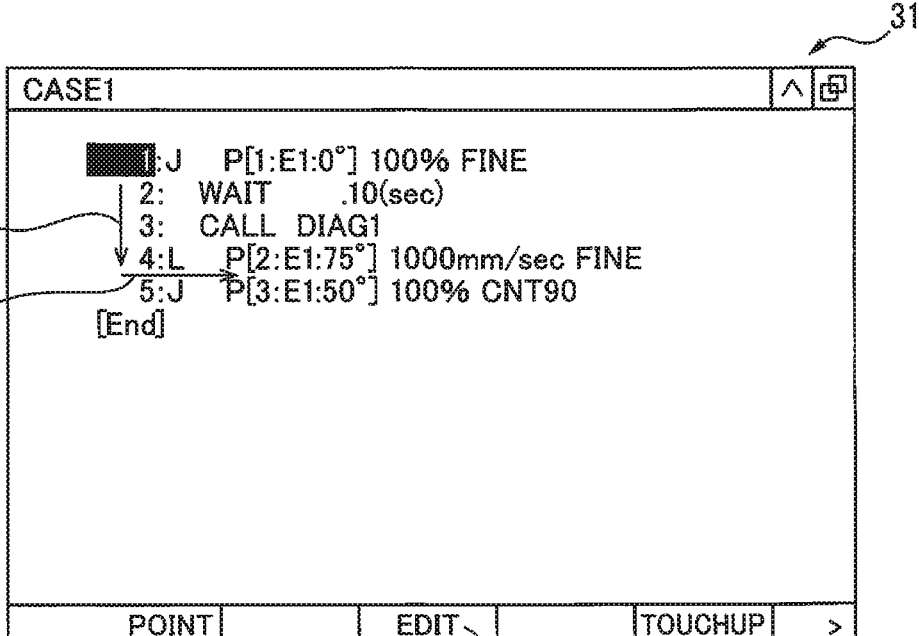
FIG. 5 is a first picture displayed by a display part according to the embodiment.

In FIG. 5, a first picture displayed by the display part according to the present embodiment is illustrated. Referring to FIG. 2 and FIG. 5, the operator performs a predetermined operation, whereby a display control part 25 reads the operation program 29 from the storage part 21. The display control part 25 displays a first picture 31 in the display part 7.

In the first picture 31, the operation program 29 is displayed. In the first picture, a main operation statement of an operation of the robot 1 and the end effector 2 is indicated. The operator can create the operation program 29 based on a predetermined rule of the operation statement. The display control part 25 according to the present embodiment is configured in such a manner as to display the operation program 29 created by the operator. In other words, the display control part 25 displays the operation program 29 created by the operator without changing a format of the operation program. The display control part 25, which is not limited to such a configuration, may be configured in such a manner as to display the operation program in a format different from the format of the operation program 29 created by the operator. For example, the display control part 25 may be configured in such a manner as to display the operation program in which a format of the operation statement is changed so that the operator can easily confirm the operation statement.

The operation program 29 is composed of the operation statement which indicates a command of the operation of the robot 1 and the end effector 2. In the operation program 29, one or more operation statement is recorded. For example, in the fourth line of the operation statement, a symbol "L" commands that the robot 1 linearly moves. A symbol "P[2: E1:75°]" commands a position of a tool tip point. The movement in which speed of the tool tip point is 1000 mm/s is commanded. A symbol "FINE" commands a type of the movement so that the robot smoothly moves. The operation control part 22 reads such operation statement, thereby being capable of generating an operation command of the robot 1 and the end effector 2.

In the operation command for driving the robot, a state of the drive axes is included. In the present embodiment, detailed information on the drive axes can be displayed in a second picture. Referring to FIG. 5, a part designated by the operator is emphatically displayed in the first picture 31. The operator operates the input part 6, thereby moving the emphasized part (cursor) as indicated by arrows 91 and 92.

For example, the operator moves the emphasized part to a part of the fourth line of the operation statement at which the position is designated.

Figure 6:
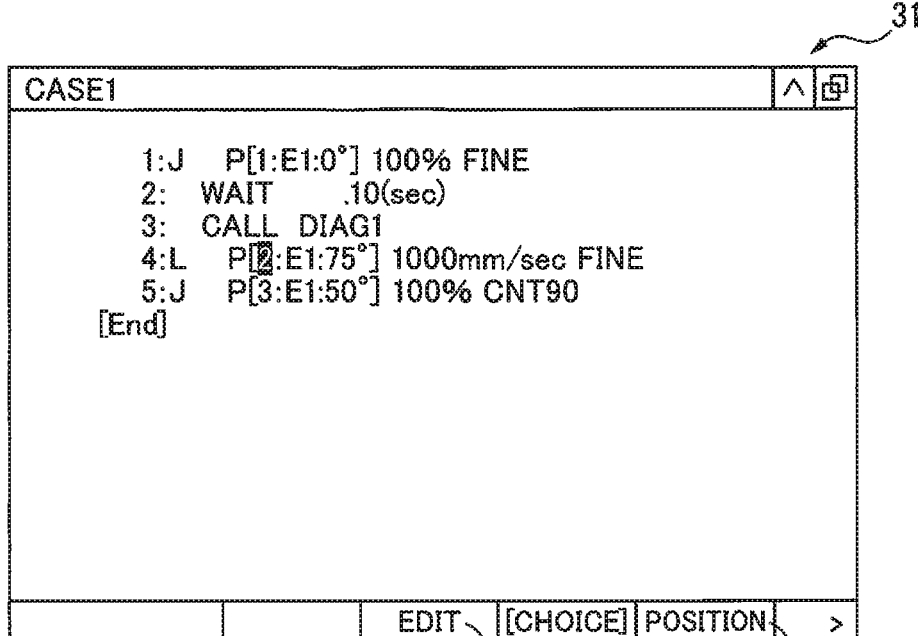
FIG. 6 is another first picture displayed by the display part according to the embodiment.

In FIG. 6, the first picture after the emphasized part has been moved is illustrated. In the fourth line of the operation statement, the part at which the position is designated is selected. The operator pushes a button 62 displayed at a lower portion of the first picture 31, whereby the picture is switched and the second picture is displayed.

In FIG. 7, the second picture displayed by the display part according to the present embodiment is illustrated. The second picture 32 is a picture which displays a state of each of the drive axes. In the second picture 32, in addition to basic information on the six drive axes J1 to J6, information on the drive axis E1 serving as an additional axis is indicated. Herein, an angle of each drive axis is displayed. Thus, the operator can confirm the operation statement in the first picture and confirm states of the drive axes according to each operation statement in the second picture. The operator selects the operation statement as desired in the first picture 31, thereby being capable of confirming detailed information on the drive axes according to the operation statement.

Further, referring to FIG. 6, in the operation statement displayed by the display part 7, the basic information on the six drive axes J1 to J6 is not indicated, while the information on the drive axis E1 serving as an additional axis is indicated. For example, in the first line of the operation statement, at a position P1, "E1:0°" is indicated in a position symbol. This operation statement indicates that the angle of the drive axis E1 is 0° at the position P1. Further, in the fourth line of the operation statement, "E1:75°" is indicated in a position symbol. It is indicated that the angle of the drive axis E1 is 75° at a position P2.

Thus, the display control part 25 according to the present embodiment displays the operation statement which includes the state of the additional axis without including the state of the six drive axes in the first picture 31.

In FIG. 8, a first picture in a control apparatus according to a comparative embodiment is illustrated. In the first picture 39 according to the comparative embodiment, an operation program which performs the same operation as the operation of the robot according to the present embodiment is displayed.

In the first picture 39 according to the comparative embodiment, the operation statement does not include information on a state of all the drive axes. The operator pushes the button 62 displayed at the lower portion of the first picture 39, whereby the second picture 32 in FIG. 7 is displayed. The operator can confirm a state of each drive axis in the second picture 32.

Note that in a common robot in conventional techniques, the number of drive axes is six or less. Consequently, with respect to the robot having a six or less drive axis, the operator can easily estimate a state of the robot 1 by referring to the operation statement. However, there are a large number of operators who are not accustomed to a robot having an additional axis. Thus, it is difficult for the operator to estimate a state of the additional axis and an operation of the robot. In the first picture according to the comparative embodiment as illustrated in FIG. 8, information on the additional axis is not indicated, and browsing the second picture is needed in order to estimate the state of the additional axis or the operation of the robot.

In contrast, in the first picture according to the present embodiment as illustrated in FIG. 5 and FIG. 6, the operation statement includes the information on the additional axis. Thus, the operator can easily estimate a state of the drive axis E1 which is the additional axis without switching to the second picture. Regardless of experiences relating to an additional axis, the operator can easily estimate the state of the additional axis. Further, the operator can easily imagine the operation of the robot 1. As a result, the operator can easily determine whether or not the operation statement as recorded in the operation program is correct. Alternatively, the operation of the robot, such as whether or not there is interference with the other devices, can be easily determined.

Referring to FIG. 5, at the lower portion of the first picture 31 according to the present embodiment, an edit button 61 is arranged. The operator pushes the button 61, thereby being capable of modifying the operation statement as selected. In particular, the operator pushes the button 61 in the first picture 31, thereby being capable of changing the information on the additional axis.

Referring to FIG. 6, for example, the operator places the emphasized part at the position P2 indicated in the fourth line. The operator can change the angle of the drive axis E1 to a desired angle by pushing the button 61. The control apparatus 3 changes the operation program. The storage part 21 stores the operation program as changed.

When the operator is not accustomed to the robot having the additional axis, there are cases in which a large number of operations for changing a setting value of the additional axis arise. However, in the control apparatus according to the present embodiment, information on the additional axis can be easily changed without switching to the second picture. The information on the additional axis as modified in the first picture is reflected in the second picture as well. Further, referring to FIG. 7, also in the second picture 32, the operator pushes an edit button 63, thereby being capable of changing an angle of the drive axis as selected.

In the present embodiment, the seven-axis robot has been described by way of example, but the present invention can be applied to an optional robot having an additional axis in addition to six drive axes. For example, when an eight-axis robot is used, the display control part can display an operation statement including information on two additional axes in the first picture.

According to the present invention, a robot control apparatus which provides a display in which a state of an additional axis can be easily grasped can be provided.

In each drawing as described above, identical reference signs are provided to identical or equivalent parts. Note that the embodiments as described above are exemplary and not to limit the present invention. Further, in the embodiments, modifications of the embodiments recited in the claims are included.

The invention claimed is:

1. A robot control apparatus for controlling a robot including six drive axes and an additional axis, the robot control apparatus comprising:
   a display part which provides a display of an operation program in which an operation statement relating to an operation of the robot is recorded; and
   a processor for controlling the display of the operation program on the display part, wherein
   the processor is configured to control the display part to display, on the display part,
      a first picture which displays the operation program including the operation statement, and
      a second picture which displays a state of the drive axes included in the operation statement, and
   the processor is further configured to control the display part to display, in the first picture, the operation statement including a state of the additional axis without including the state of the six drive axes.

2. The robot control apparatus according to claim 1, wherein the processor is configured to edit the state of the additional axis in the operation statement in the first picture.

3. The robot control apparatus according to claim 1, wherein the additional axis is a drive axis for changing a direction of an arm of the robot.

4. The robot control apparatus according to claim 1, wherein the first picture displays a main operation statement of the operation of the robot and an end effector of the robot.

* * * * *